Figure 14:

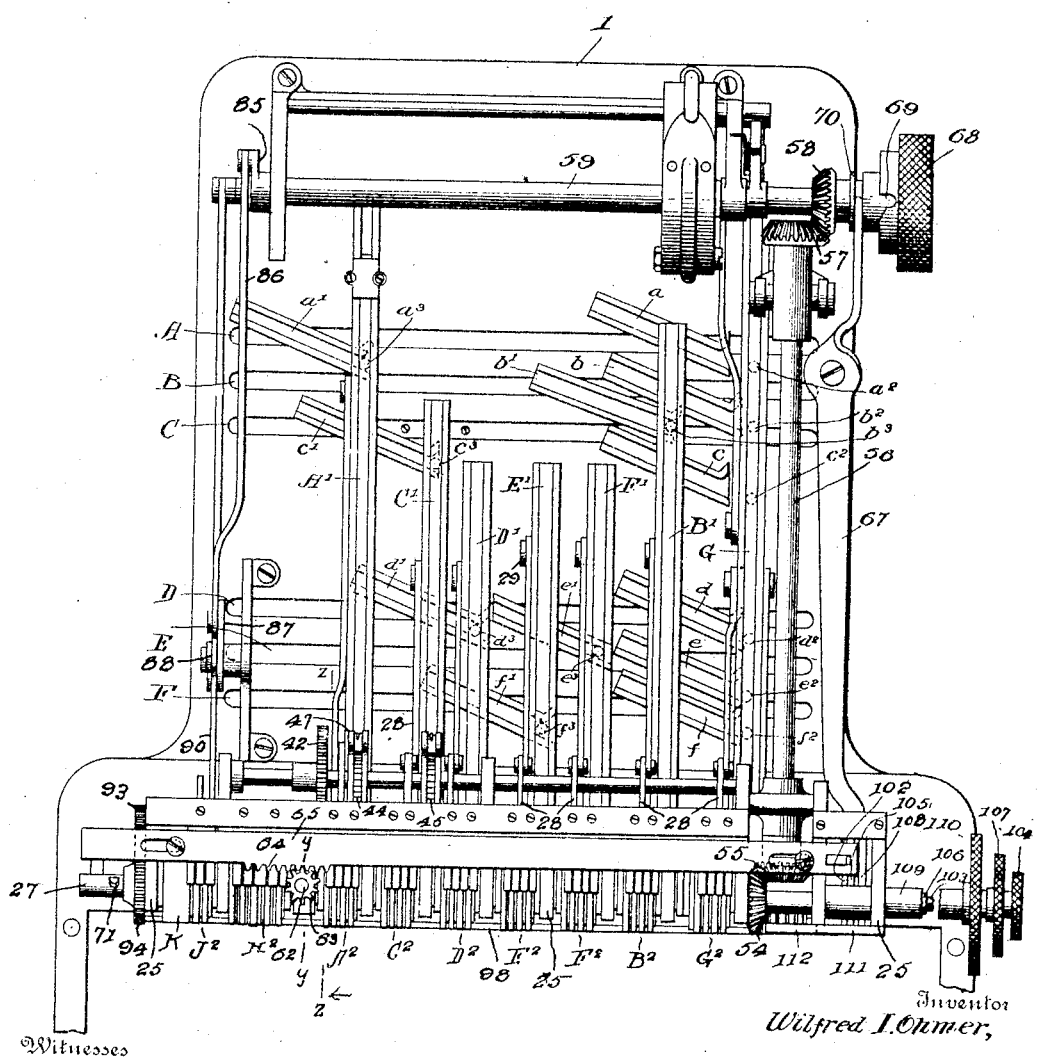

No. 764,494. PATENTED JULY 5, 1904.
W. I. OHMER.
FARE REGISTER AND RECORDER.
APPLICATION FILED NOV. 28, 1903.
NO MODEL. 12 SHEETS—SHEET 2.
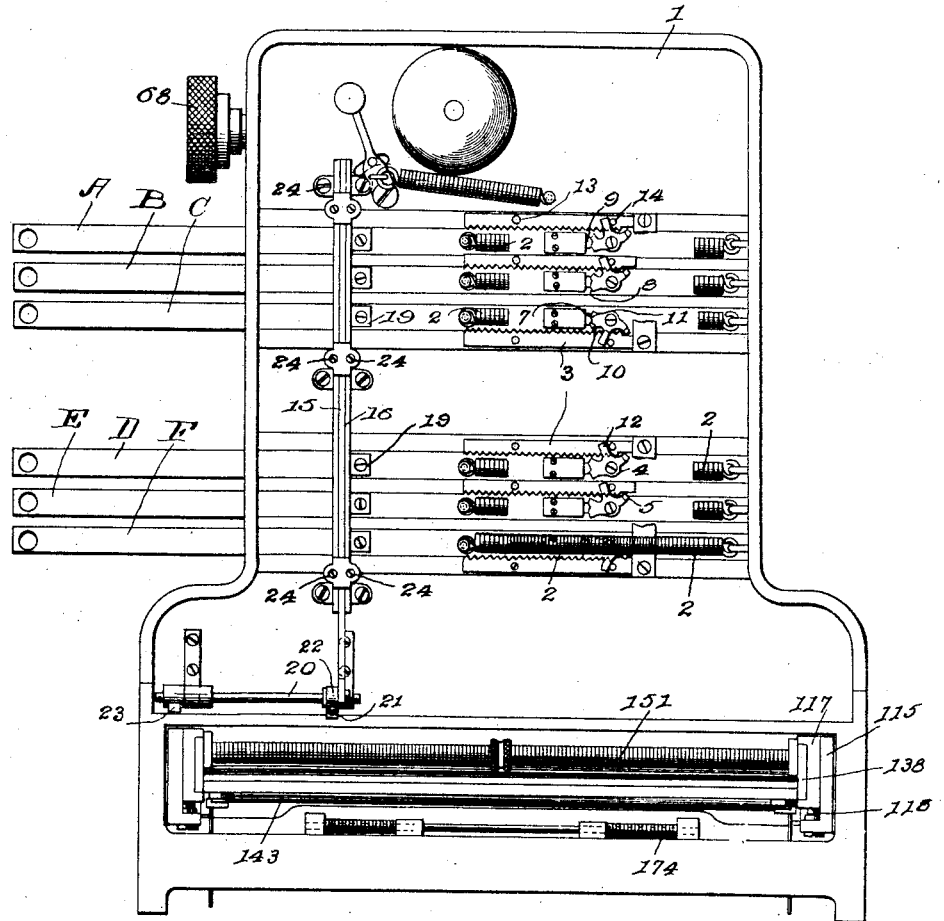
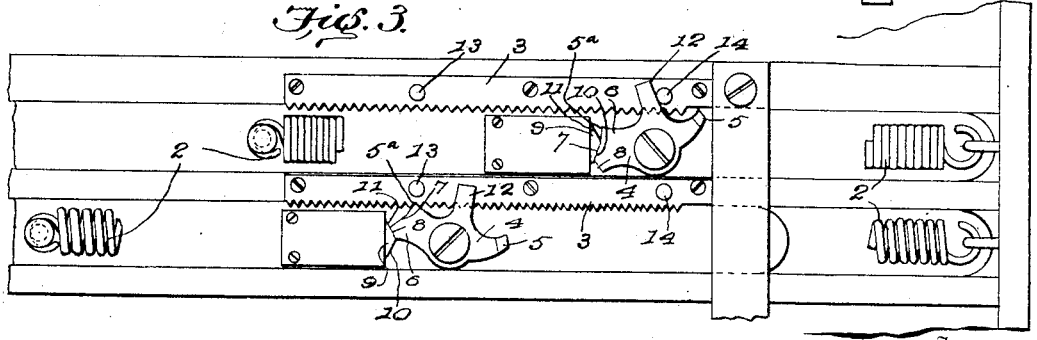
Witnesses
Inventor
Wilfred I. Ohmer,
By H. A. Toulmin,
Attorney

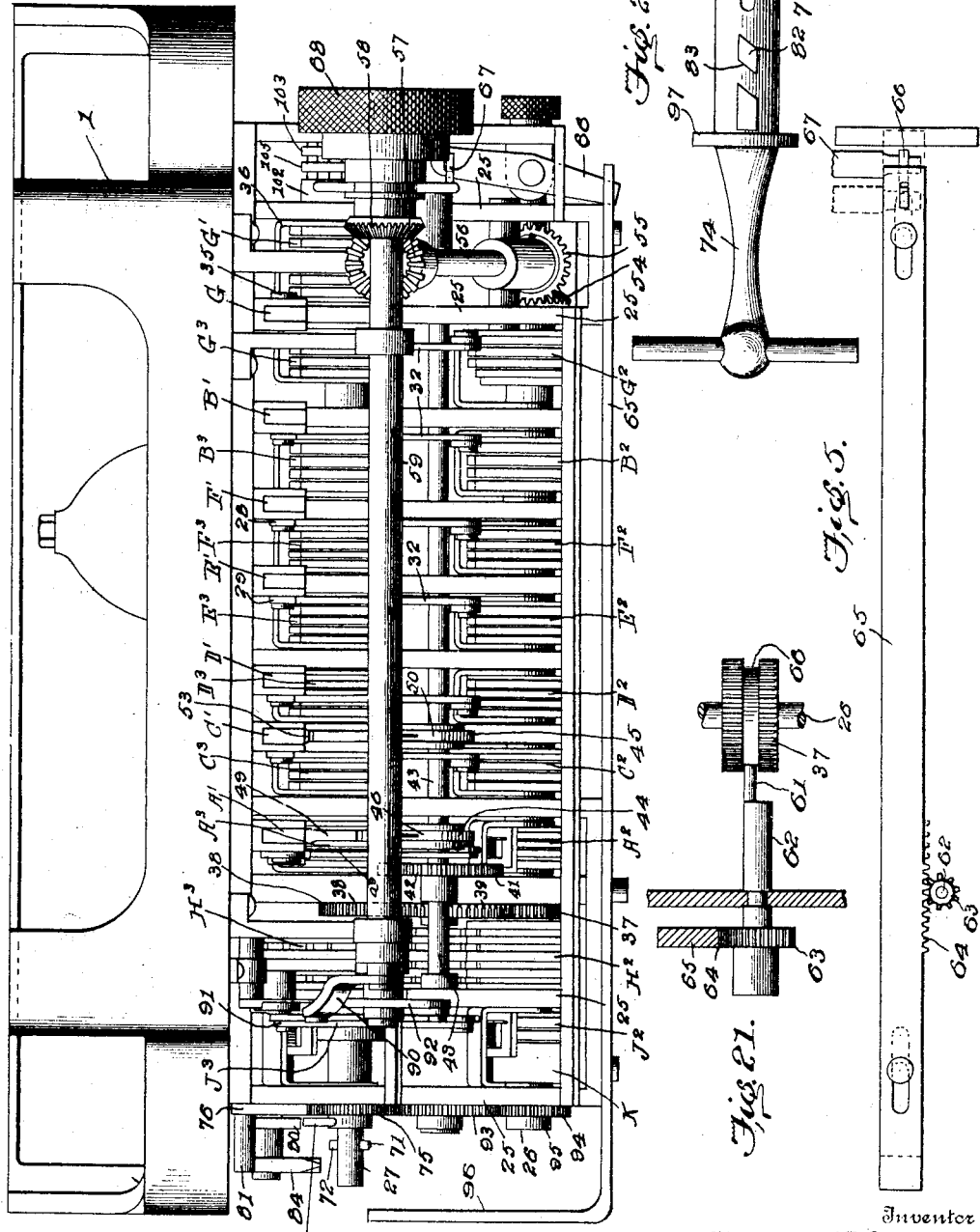

No. 764,494. PATENTED JULY 5, 1904.
W. I. OHMER.
FARE REGISTER AND RECORDER.
APPLICATION FILED NOV. 28, 1903.
NO MODEL. 12 SHEETS—SHEET 4.
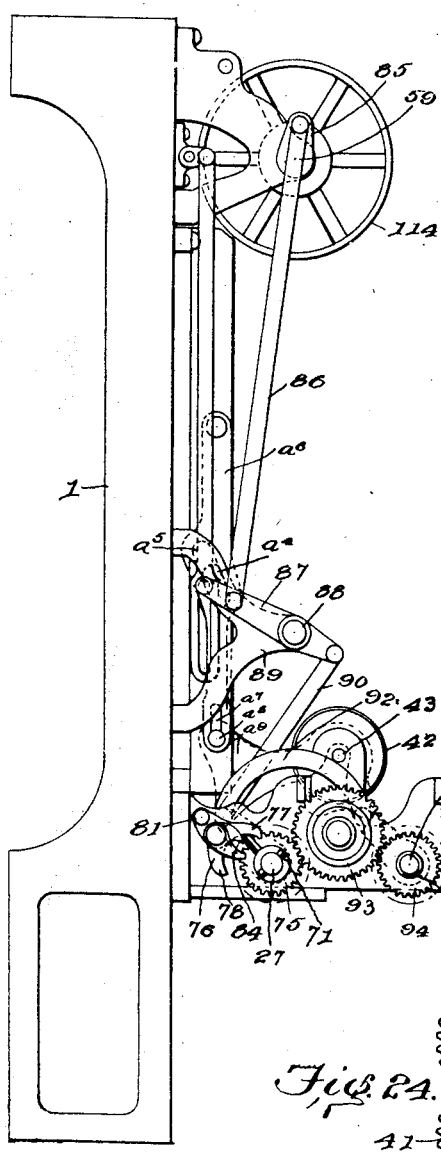

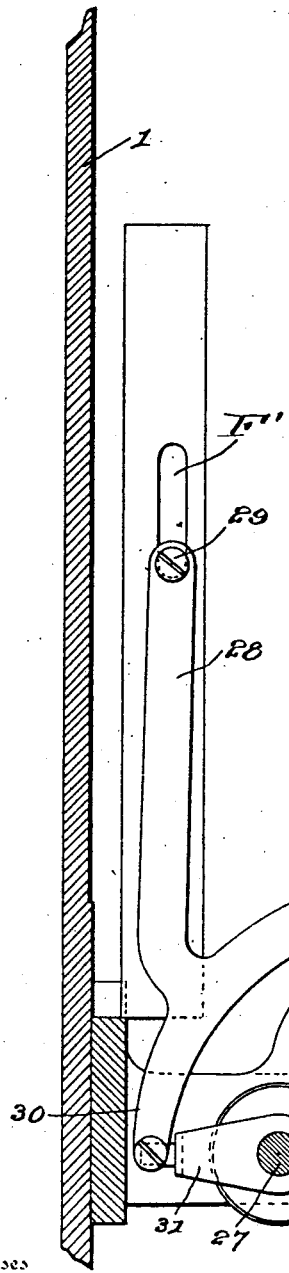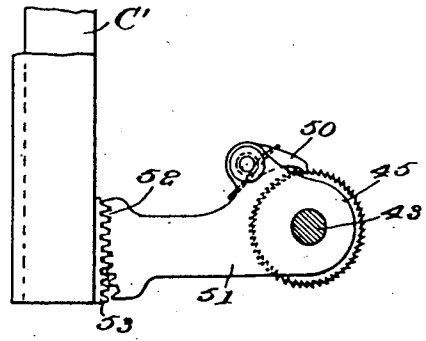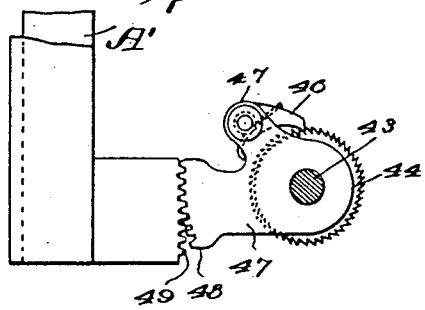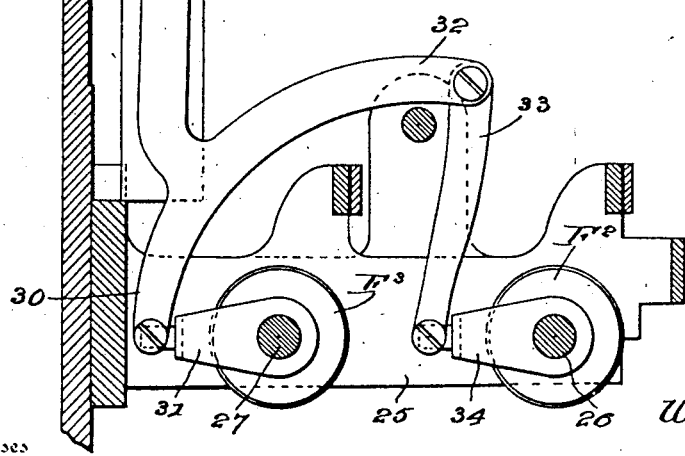

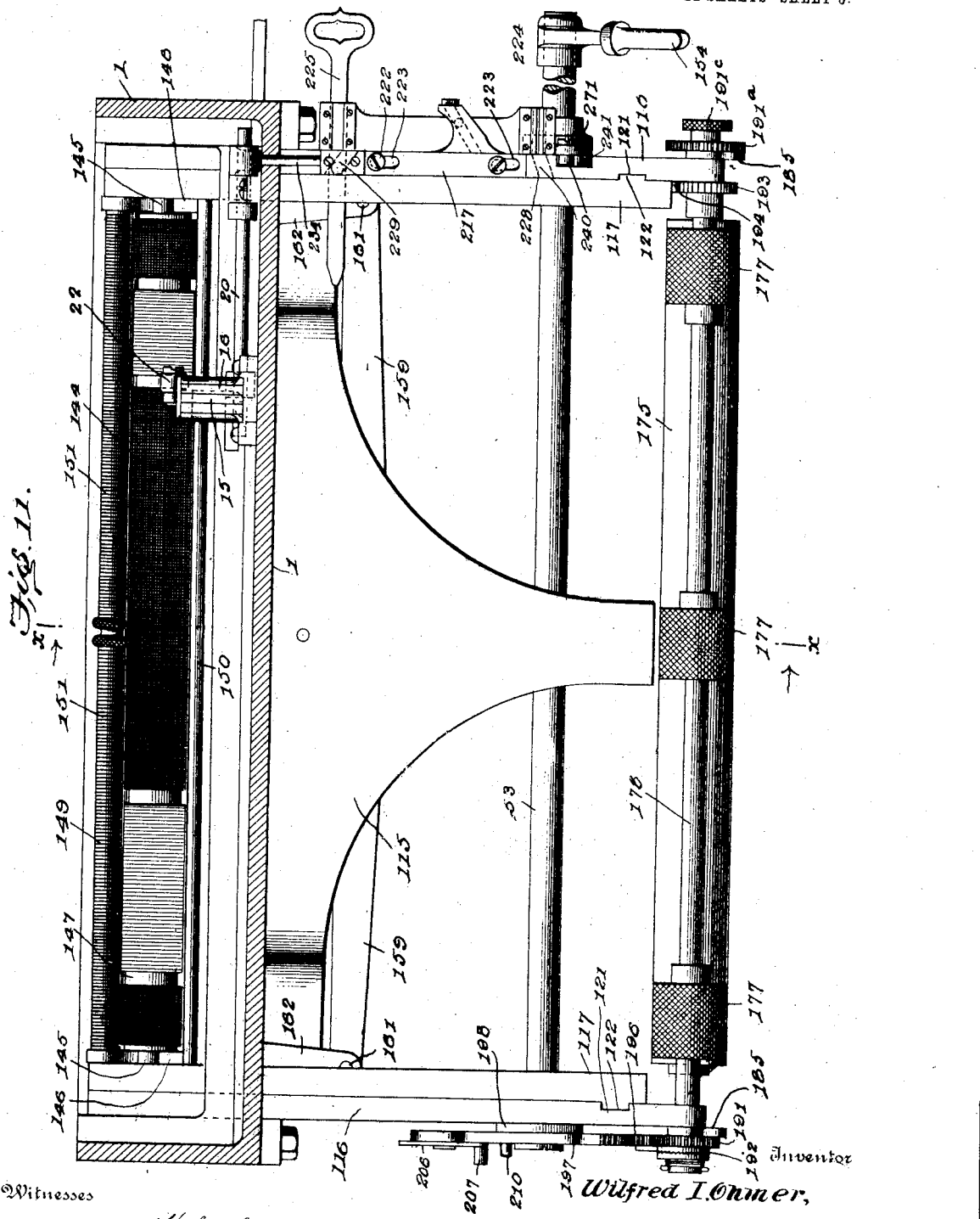

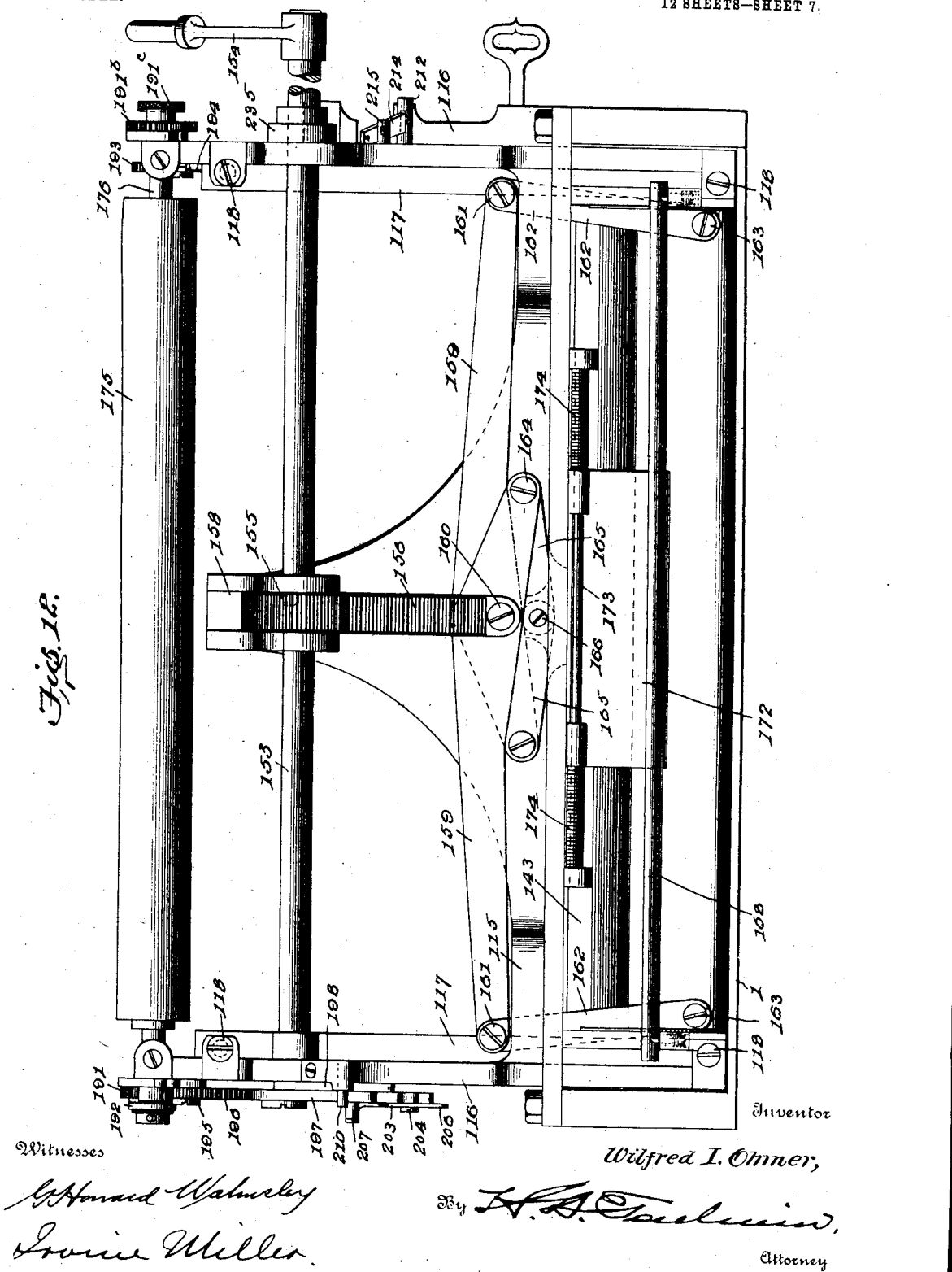

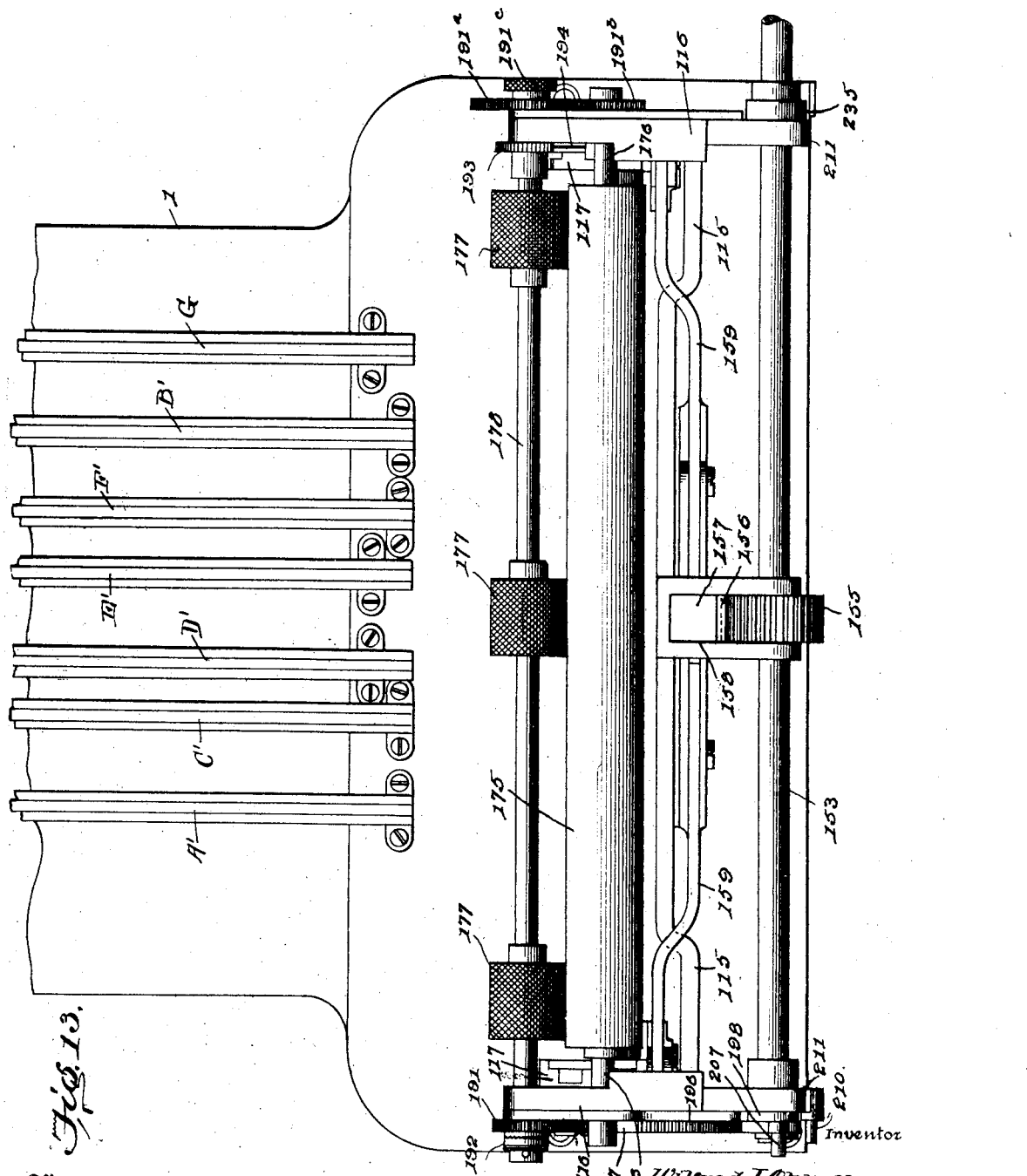

No. 764,494. PATENTED JULY 5, 1904.
W. I. OHMER.
FARE REGISTER AND RECORDER.
APPLICATION FILED NOV. 28, 1903.
NO MODEL. 12 SHEETS—SHEET 9.

Witnesses
G. Howard Walmsley
Irvine Miller

Inventor
Wilfred I. Ohmer,

Attorney

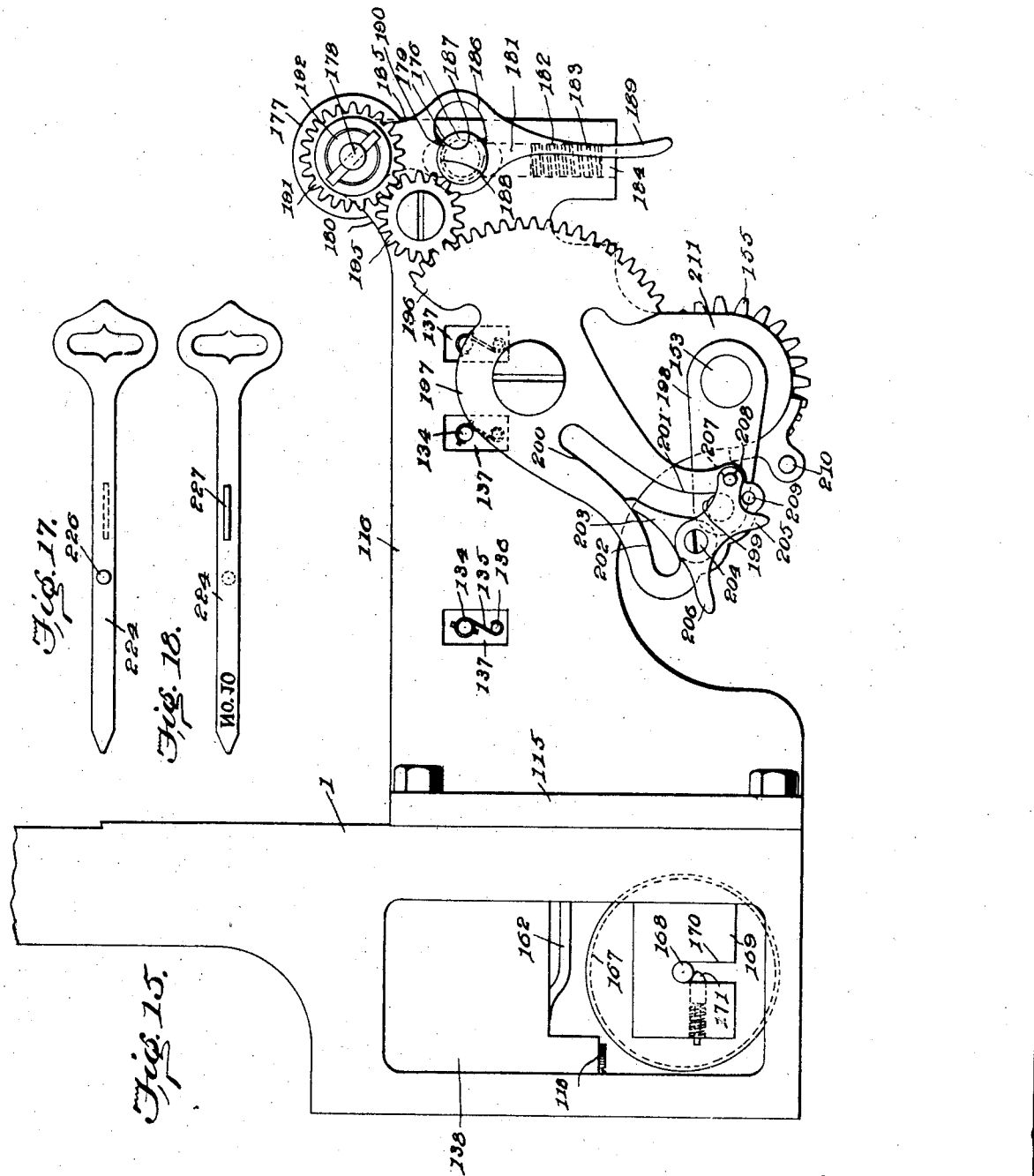

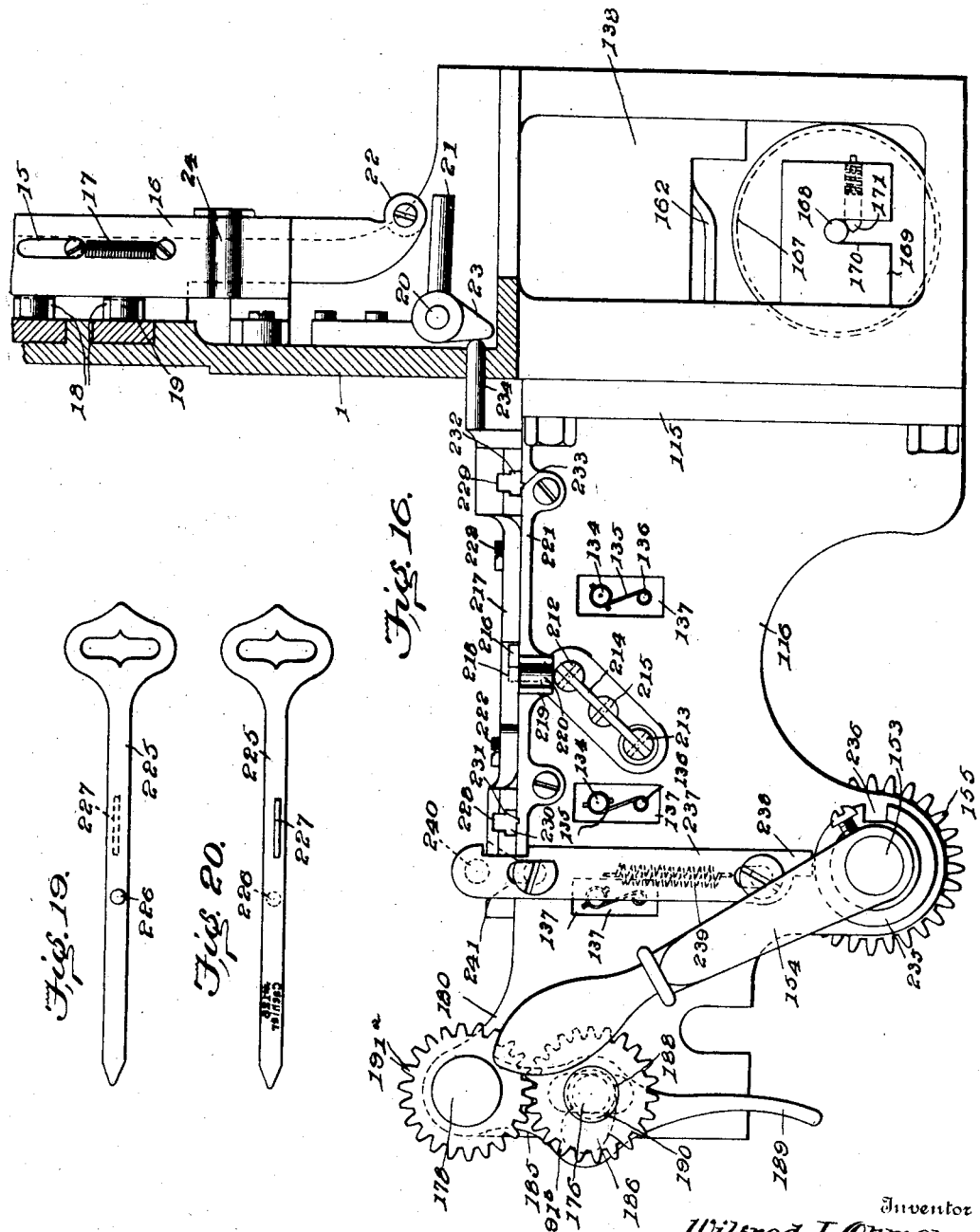

No. 764,494. PATENTED JULY 5, 1904.
W. I. OHMER.
FARE REGISTER AND RECORDER.
APPLICATION FILED NOV. 28, 1903.
NO MODEL. 12 SHEETS—SHEET 12.

*Fig. 22.*

*Fig. 23.*

UNION TRACTION COMPANY, DAYTON, OHIO.

No. 238

| Trip No. | Cash Total | 5c. Fares | 3c. Fares | Half Ticket | Full Ticket | Transfers | Passes | Trip Total | Grand Total | Cashier #126 |
|---|---|---|---|---|---|---|---|---|---|---|
| 04 | 008.37 | 0135 | 0054 | 0073 | 0220 | 0125 | 0123 | 0730 | 962307 | NOV 19 |

DAILY TOTAL RECORD.

CONSECUTIVE TRIP RECORD.

| | | | | | | | | | | |
|---|---|---|---|---|---|---|---|---|---|---|
| OUT 04 | 000.70 | 0011 | 0005 | 0012 | 0043 | 0004 | 0007 | 0082 | CAR 956 | C 142 |
| IN 03 | 003.78 | 0063 | 0021 | 0008 | 0072 | 0017 | 0009 | 0190 | CAR 956 | C 142 |
| OUT 02 | 001.55 | 0022 | 0015 | 0020 | 0088 | 0056 | 0082 | 0283 | CAR 956 | C 142 |
| IN 01 | 002.34 | 0039 | 0013 | 0039 | 0017 | 0048 | 0025 | 0175 | CAR 356 | C 142 |

Witnesses
E Howard Walmsley
Irvine Miller

Inventor
Wilfred I. Ohmer,
By H. A. Toulmin,
Attorney

No. 764,494. Patented July 5, 1904.

UNITED STATES PATENT OFFICE.

WILFRED I. OHMER, OF DAYTON, OHIO, ASSIGNOR TO THE RECORDING AND COMPUTING MACHINES COMPANY, OF DAYTON, OHIO.

FARE REGISTER AND RECORDER.

SPECIFICATION forming part of Letters Patent No. 764,494, dated July 5, 1904.

Application filed November 28, 1903. Serial No. 183,003. (No model.)

*To all whom it may concern:*

Be it known that I, WILFRED I. OHMER, a citizen of the United States, residing at Dayton, in the county of Montgomery and State of Ohio, have invented certain new and useful Improvements in Fare Registers and Recorders, of which the following is a specification, reference being had therein to the accompanying drawings.

This invention relates to fare registers and recorders, and is in the nature of an improvement upon the construction set forth in an application filed by me May 4, 1903, Serial No. 155,593, for improvement in fare-registers.

The primary object of my present invention is to provide a machine which will produce two records, the one consisting of a series of records of each individual trip and the other being a final record covering the totals of the several trip-records for any desired period of time—such, for instance, as one day. In this way the record-sheet produced by the machine gives a complete record of each trip and a final record, which is the sum of the records of the several trips.

The machine in its preferred form comprises a duplicate series of printing-counters arranged in two groups, each group being composed of a plurality of printing-counters for giving the total number of fares of each class received and also, preferably, a cash-total printing-counter for giving the total amount of cash received and a printing-counter for giving the total number of passengers on each trip.

The machine further comprises an operating mechanism for each class of fare, which operating mechanism simultaneously operates the two printing-counters of the two groups relating to the particular class of fare involved. Provision is made for resetting all of the printing-counters of one of the two groups at the end of each trip by the conductor and for preventing him from in any way affecting the counters of the other group. Provision is further made for resetting the counters of the said second group, which is the daily-total group, by an inspector or cashier. Printing mechanism is provided whereby the conductor may print a record at the end of each trip before resetting the machine for the next trip, and provision is also made by which the inspector or cashier may print the daily-total record, the arrangement being such that while a single printing mechanism is used the conductor can print only the trip-records and the inspector or cashier can print only the daily-total record. Further provision is made by which no record can be taken without the use of an identifying-key, which imprints an identifying character upon the record. Separate keys are provided for the conductors and for the inspectors or cashiers. When no key is inserted in the machine, all of the parts thereof are locked. When the conductor's key is inserted in the machine, the register proper, including the fare-printing counters, the fare-indicators, the fare-register, and the various operating mechanisms for these parts, are unlocked or operative and the printing mechanism is unlocked, so as to be capable of printing the trip-records, but is locked so far as the printing of the daily-total record is concerned. When the cashier's key is inserted in the machine, the registering portion thereof is locked, and the only parts thereof which are operative are the mechanism for printing the daily-total record and the resetting mechanism. Thus the conductor by means of his key can register and record the fares and can print the totals for each trip and reset those portions of the machine relating to the trip-totals. The cashier by means of his key can print the daily total and reset the entire machine, but can do nothing else. In this way the complete record produced by the machine comprises a series of records, one for each trip, controlled only by the conductor in charge during that trip and identified as having been made by him, and a grand-daily-total record over which the conductor has no control and made by an official who has no control over the records made by the several conductors. The machine thus not only totalizes each trip separately and the entire day's work separately, so that the one can be checked from the other and the total day's work read at a glance, but these records are made by separate individuals at different times, their record-making powers being strictly limited to their own particular work.

In the accompanying drawings, Figure 1 is a front elevation of a machine embodying my invention in one form, the casing being removed, as well as the printing mechanism, the fare-indicators, the indicating-register, and certain other parts. Fig. 2 is a rear elevation of the machine with the casing removed. Fig. 3 is an enlarged detail view of two of the actuating-slides in rear elevation. Fig. 4 is an enlarged plan view of what is shown in Fig. 1. Fig. 5 is a detail front elevation of a portion of Fig. 4. Fig. 6 is an elevation of the machine from one side with the casing and printing mechanism removed. Fig. 7 is a similar view from the opposite side of the machine. Fig. 8 is an enlarged detail sectional view illustrating the connections for simultaneously operating similar printing-counters of the two groups. Fig. 9 is a detail sectional view illustrating a portion of the differential mechanism for operating the cash-total printing-counter. Fig. 10 is a similar view of another portion of said differential mechanism. Fig. 11 is a plan section illustrating the printing mechanism. Fig. 12 is a bottom plan view of the same. Fig. 13 is a front elevation of the printing mechanism. Fig. 14 is a vertical sectional view of the printing mechanism, taken on the line $x\ x$ of Fig. 11 and looking in the direction of the arrows. Fig. 15 is an enlarged elevation of one side of the lower portion of the machine in which the printing mechanism is located. Fig. 16 is a similar view from the opposite side of the machine and partly in section. Figs. 17 and 18 are views of the opposite sides of the cashier's key. Figs. 19 and 20 are similar views of the opposite sides of the conductor's key. Fig. 21 is a detail sectional view taken on the line $y\ y$ of Fig. 1 and looking in the direction of the arrows. Fig. 22 is a face view of the printing-plate employed in connection with the printing-counter. Fig. 23 is a view of the record-sheet which constitutes the product of the machine. Fig. 24 is a detail sectional view of a portion of the gearing, taken on the line $z\ z$ of Fig. 1 and looking in the direction of the arrows; and Fig. 25 is a view of the cashier's resetting-key.

Referring to the drawings, in which I have shown my present invention as embodied in a fare-register of a character similar to that set forth in my prior application hereinbefore referred to, it will be noted that I have omitted the inclosing casing, which may be of any approved construction.

1 indicates the base of the machine, which forms the back of the casing and which supports the various mechanisms of which the machine is composed. This base is provided with transverse grooves to receive the actuating-slides, which in the present instance are shown as six in number and are indicated by the respective reference-letters A, B, C, D, E, and F. These slides project beyond the side of the casing for connection with the operating devices whereby they are respectively actuated and are normally drawn inward or retracted by means of springs 2. In order to prevent the slides from being only partially drawn out and then released, I provide a full-stroke mechanism, which is shown in detail in Fig. 3. It consists of a toothed rack 3, located adjacent to each slide, and a pawl 4, pivoted on the slide and provided with teeth 5 and $5^a$, adapted to engage the rack 3. The pawl 4 is provided with a cam-piece 6, having diverging bearing-surfaces 7 and 8, in conjunction with which there operates a spring-actuated sliding piece or bolt 9, mounted on the actuating-slide and having its end beveled to present the oppositely-inclined bearing-surfaces 10 and 11. The pawl 4 is provided with an arm 12, in the path of which lie fixed pins 13 and 14. The normal position of the parts is shown in connection with the uppermost of the two slides shown in Fig. 3, and in this position the spring-bolt 9 bears with its surface 10 against the surface 7 of the pawl 4, so as to hold the tooth 5 yieldingly in position to engage the rack 3. As the slide is drawn out the tooth 5 will yield to pass over the successive teeth of the rack 3; but no return movement of the rack is possible when the pawl is in this position, since the tooth 5 would engage with the teeth of the rack in such a way as to prevent said return movement. When the slide has reached the limit of its movement, however, the arm 12 of the pawl strikes against the pin 13 and the pawl is thrown over into the position shown in connection with the lowermost of the two slides shown in Fig. 3. In this position the surface 11 of the spring-bolt 9 bears against the surface 8 of the pawl and holds the tooth 5 out of engagement with the teeth of the rack engaging the tooth $5^a$ and permitting the return movement of the slide. At the end of this return movement the arm 12 strikes the pin 14 and the pawl is again thrown over into its original position. By this means it is necessary to move the slide to the full limit in either direction before a reverse movement is possible.

In connection with the actuating-slides I employ a locking mechanism actuated by the means hereinafter described and serving either to permit or prevent movement of said slides and of the mechanisms controlled thereby, according to its position. This locking mechanism consists of a locking-bar 15, mounted to slide vertically in a guideway 16 on the back of the base 1 and extending across all of the slides. This locking-rod is normally drawn downward by a spring 17 and is provided in its front edge adjacent to the slides with a plurality of notches 18, corresponding in number and location with the slides. Each slide is provided with a projection 19 of a size such as to permit it to pass through the corresponding notch 18 of the locking-bar when said notches and projections are in alinement. The normal position of the locking-bar, in which it is held by the spring 17, is at the downward limit of its movement, in which position the notches and projections do not register and the actuating-slides are locked. When the locking-bar is raised to its upward limit of movement, the notches and projections register and the slides are free to move. In the present instance I provide between the locking-bar and its actuating mechanism an intermediate transmitting mechanism consisting of a rock-shaft 20, mounted on the rear of the base and provided with an arm 21, in the path of which the lower end of the locking-bar lies, said lower end being preferably provided with an antifriction-roller 22, which contacts with the arm 21. The other end of the rock-shaft 20 is provided with an arm 23, by means of which said rock-shaft receives movement from its actuating mechanism. The guideway 16, in which the locking-bar travels, may be provided with antifriction-rollers 24, if deemed desirable.

The actuating-slides operate a corresponding series of slide-bars on the front of the base 1, each slide operating a corresponding slide-bar and the slide-bars of the respective actuating-slides A, B, C, D, E, and F being lettered, respectively, A', B', C', D', E', and F'. There is also a common slide-bar G, which is actuated by each of the actuating-slides. To this end the actuating-slide A is provided with inclined grooved cam-pieces $a$ and $a'$, adapted to respectively engage projections $a^2$ and $a^3$ on the common slide-bar G and slide-bar A', respectively. The projections on the slide-bars are preferably in the form of antifriction-rollers; but in other respects the structure is as to these features similar to what is set forth in my prior application, hereinbefore referred to. Similarly the actuating-slide B has cam-pieces $b$ and $b'$ to engage projections $b^2$ and $b^3$ on the slide-bars G and B', respectively. The actuating-slide C has cam-pieces $c$ and $c'$ to engage projections $c^2$ and $c^3$ on the slide-bars G and C', respectively. The actuating-slide D has cam-pieces $d$ and $d'$ to engage projections $d^2$ and $d^3$ on the slide-bars G and D', respectively. The actuating-slide E has cam-pieces $e$ and $e'$ to engage projections $e^2$ and $e^3$ on the slide-bars G and E', respectively. The actuating-slide F has cam-pieces $f$ and $f'$ to engage projections $f^2$ and $f^3$ on the slide-bars G and F', respectively. Below the lower ends of the slide-bars there are secured to the base 1, extending forward therefrom, brackets 25, which serve to support the printing-counters. These latter, so far as their arrangement and functions are concerned, constitute one of the salient features of novelty of my invention. These counters are arranged in two groups each composed of a plurality of counters and the counters of one group corresponding with the counters of the other group. The similar counters of the two groups are connected to the same operating mechanism, so that the actuation of said operating mechanism will simultaneously operate the two similar counters of each group. The two groups of counters differ from each other, however, as to their zero setting or resetting mechanism both as to the physical means employed and as to the person or employee by which said means are operated, so that one group of counters may be employed to produce records covering a comparatively short period of time, such as the records of each of the several trips made by a car, these records being produced by and under the control of one employee or set of employees—as, for instance, the conductor or conductors—who may take each record and reset the counters of that group after the record is taken. The other group of counters is adapted to produce a record covering a longer period of time—as, for example, the record of the entire day's work, which will of course be the total of all the records produced by the first group of counters—the same being produced or controlled by another employee or set of employees, such as an inspector or cashier, hereinafter referred to as "cashier," who makes this record and then resets the second group of counters. For convenience of description I will refer to the counters of the first-mentioned group, which in the present construction lie nearest the front of the machine, as the "consecutive-trip-total" counters, while the second group of counters, lying in the rear of the first-mentioned group, may be termed the "daily-total" counters. Such of these counters as relate to the total number of classified fares of each class received are indicated in the first group by the reference-letters from $A^2$ to $F^2$, respectively, and in the second group by the reference-letters from $A^3$ to $F^3$, respectively. In addition to these classified-fare counters each group contains a total-passenger counter, giving the total number of passengers, which is the total of all of the classified-fare counters just referred to, these counters being indicated in the two groups by the reference-letters $G^2$ and $G^3$, respectively. In addition to this each group comprises a total-cash counter, to be hereinafter referred to, and a trip-number counter, to be hereinafter referred to. The daily-total group includes a grand-total counter, and the consecutive-trip group includes a direction-printing wheel, to both of which further reference will be hereinafter made. The counters of the first group are mounted upon a common shaft 26, supported in suitable bearings in the brackets 25, and the counters of the second group are mounted upon a common shaft 27, also supported in suitable bearings in the brackets 25, parallel with the shaft 26 and in the rear thereof. Each of the slide-bars is adapted to operate the two corresponding counters of the two groups by means of the mechanism shown in detail in Fig. 8. This consists of a link 28, pivoted to the slide-bar at 29 and having its lower end bifurcated, one arm, 30, being connected directly to the actuating-yoke 31 of the counter of the rear group, while the other arm, 32, is connected by a link 33 to the actuating-yoke 34 of the counter of the front group. The group chosen for purposes of illustration is that actuated by the slide-bar F'. The construction may be similar as to all of the slide-bars, although in the present instance, owing to the location of certain gearing hereinafter described, the connection from the slide-bar A' to its counters is slightly different. As shown in dotted lines in Fig. 6, this slide-bar is provided with a pin $a^4$, which moves in a diagonal slot $a^5$ in a pivoted arm $a^6$. The lower free end of this arm is slotted at $a^7$ to receive a pin $a^8$, by means of which it is connected to a curved coupling-bar $a^9$, the ends of which are in turn connected to the operating-yokes of the counters $A^2$ and $A^3$. It will be understood, of course, that the printing-counters are of any approved construction, consisting of a plurality of wheels, each having on its periphery printing characters from "0" to "9" and the construction being such that each complete vibration of the actuating-yoke increases by one unit the number which the alined character of the several wheels in printing position will imprint upon the record. The common slide-bar G in addition to its link 28 for operating the counters $G^2$ and $G^3$ also has pivoted to its opposite side a link 35, which is connected to the operating-yoke 36 of the grand-total counter G', as shown more particularly in Fig. 7.

Each of the two groups of counters comprises a cash-total printing-counter, the same being indicated, respectively, by the reference-letters $H^2$ and $H^3$, the former having its printing-wheels mounted on the shaft 26 and the latter having its printing-wheel mounted on the shaft 27. The counter $H^2$ comprises a master-pinion 37, which controls the position of the printing-wheels of that counter, the counter $H^3$ having a similar master-pinion 38. These two pinions mesh with a gear 39, located between them on one end of a short shaft 40, having on its other end a pinion 41, which meshes with a gear 42, mounted on a shaft 43, supported in suitable bearings in the brackets 25. This shaft has secured thereon two ratchet-wheels 44 and 45. The ratchet-wheel 44 is controlled by a spring-pawl 46, mounted in a yoke 47, terminating in a gear-segment 48, said yoke being mounted loosely on the shaft 43. This gear-segment meshes with a rack 49, carried by the slide-bar A'. Similarly the ratchet-wheel 45 is controlled by a spring-pawl 50, carried by a yoke 51, loosely mounted on the shaft 43, and provided with a gear-segment 52, meshing with a rack 53, carried by the slide-bar C'. It will be observed that the segment-arm of the yoke 51 is longer than the segment-arm of the yoke 47, the racks 49 and 53 being located at different distances from the bodies of the slide-bars to which they are attached, so as to effect their engagement with the respective segment-arms of different lengths. It arises from this construction that a complete reciprocation of the guide-bar A' will turn the shaft 43 a distance sufficient to cause the printing-counters $H^2$ and $H^3$ to register a number of units corresponding to the fare to which the slide-bar A' relates—in the present instance a cash fare of five cents. Similarly a complete movement of the slide-bar C' will, through the ratchet-wheel 45, turn the shaft 43 to an extent sufficient to move the counters $H^2$ and $H^3$ to a less extent than when the slide-bar A' is actuated, the actual movement in the present instance being sufficient to add three units on the printing-counters. By reason of this construction two different fares may be added on the printing-counters $H^2$ and $H^3$, and by the further development of the same system any desired number of different cash fares may be separately added on said printing-counters.

Referring now to the resetting mechanism for the first or trip group of printing-counters, by means of which they may be simultaneously set to zero at the end of the trip, it should be first noted that all of the printing-wheels of the several counters of this group are so mounted upon the shaft 26 by any of the well-known devices for that purpose that a revolution of said shaft forward or in the direction of the adding movement of the counters will set all of said wheels to zero. This is accomplished by suitable provision for imparting such a rotary movement to said shaft, and in the present instance this provision consists of a bevel-pinion 54 on one end of the shaft, meshing with a similar bevel-pinion 55 on a shaft 56, extending upward toward the top of the machine. At its upper end the shaft 56 is provided with a bevel-pinion 57, meshing with a bevel-pinion 58 on a shaft 59, which is preferably the shaft carrying the passenger-indicating register, by means of which the total number of passengers on any given trip is visibly indicated, said shaft constituting a means for resetting said indicator to zero. By this means the trip-indicator and the trip-printing counters are simultaneously set to zero at the end of each trip by the conductor. Since the two cash-total printing-counters are normally connected by a gearing, so as to move in unison, and since it is not desired to return the cash printing-counter H³ of the daily-total group to zero when the counter H² is reset to zero at the end of each trip I provide means for disconnecting the two counters while the trip-counters are being set to zero. In the present instance this means consists in splining the pinion 37 upon the shaft 26, so as to permit it to move longitudinally on said shaft while rotating in unison with it. The pinion 37 is provided with a groove 60, into which extends an arm 61 from a rock-shaft 62, located at right angles to the shaft 26 and provided on its outer end with a pinion 63. This pinion meshes with a rack 64 on a slide-bar 65, suitably mounted and supported from the brackets 25, so as to move longitudinally thereon parallel with the shaft 26. This slide-bar is actuated by a lever 66, pivoted on one of the brackets 25 adjacent to the lower end of the shaft 56 and engaging the slide-bar 65 by one of its ends, while its other end is engaged by the lower end of a lever 67, extending upward alongside the shaft 56. The shaft 59 is provided at one end with an operating-head 68, which turns with said shaft and which is movable longitudinally thereof to effect the locking of said shaft. To this end said operating-head is provided with a notch 69, which is held normally in engagement with a suitable projection on the casing by means of a spring, so that the head 68 must be first drawn outward to disengage it before it can be rotated to effect the resetting operation. The hub of the head 68 is provided with a circumferential groove 70, in which the upper end of the lever 67 is engaged, so that the outward or unlocking movement of the head 68 actuates the levers 66 and 67 and moves the slide-bar from its normal position, (shown in dotted lines in Fig. 5,) to the position shown in full lines in said figure. This movement rotates the rock-shaft 62 through the rack 64 and pinion 63 and slides the pinion 37 along the shaft 26, so that the rotary movement imparted to said shaft by the resetting mechanism will not be transmitted to the cash printing-counter H³ of the daily-total group. By an obvious transposition the operating-head may be transferred from the shaft 59 to the shaft 56, in which case the intermediate lever 67 may be dispensed with.

The resetting of the daily-total group of counters is accomplished by a rotation of the shaft 27 in the direction in which the printing-wheels thereon move in their normal or counting movements, said printing-wheels being so connected with said shaft by any of the well-known devices for that purpose that such rotation of said shaft will turn all of the printing-wheels to zero. It should be noted in this connection, however, that the printing-wheels constituting the grand-total counter G' are not so connected with the shaft 27 as to be affected by its movements. The resetting of the daily-total counters is effected by the cashier or other similar officer at the end of the day, who is provided for this purpose with a key. (Shown in detail in Fig. 26.) The end of the shaft 27 projects to receive this key and is provided with pins or projections 71, which fit in notches 72 in the end of the cylindrical hollow barrel 73 of the key 74, which barrel slips over the projecting end of the shaft 27 until the pins are introduced into said notches. The shaft 27 may then be turned, by means of the key, so as to set all of the daily-total counters to zero. In order to provide means for insuring the stoppage of the rotation of the shaft 27 at the end of the resetting operation, I employ an overthrow-preventing device comprising a gear 75, mounted on the shaft 27, with which coöperates a double pawl 76, having two arms 77 and 78, either one of which may be engaged with the gear 75. The arm 77 permits the gear to turn in the direction proper to effect the resetting, but prevents its rotation in the opposite direction when in engagement with said gear. The arm 78 when in engagement with the gear locks it, so as to prevent any further motion of the resetting-shaft in the direction necessary to effect the resetting. The shaft 27 is provided with a projection 79, and the pawl is provided with an arm 80 in the path of said projection. The normal position of the pawl is that shown, for instance, in Fig. 6, with the arm 77 in engagement with the gear 75, so that when the key is connected with said shaft the shaft can be turned one complete revolution in the proper direction. At the end of said single revolution the projection 79 engages the arm 80 and throws the pawl over until its arm 78 engages the gear 75, and thus locks the shaft against further movement in the resetting direction. The pawl is provided with a spring-detent 81, which serves to hold it in either one of the two positions into which it may be moved. In order to provide for the unlocking of the overthrow-preventer upon the withdrawal of the key, so that when the key is again inserted the resetting operation may be performed, I provide upon the key a projection 82, having a beveled face 83 at its outer end, the pawl being provided with an arm 84, which is thrown into the path of the projection 82 by the locking movement of the pawl at the end of the resetting operation. When the key is withdrawn, the inclined face 83 of the projection 82 comes into contact with the arm 84 and serves to bring the pawl back into normal position as the key is withdrawn.

As hereinbefore stated, each of the two groups of printing-counters comprises a printing-counter for printing the number of the trip, these counters being indicated by the reference-letters J² and J³, respectively. These counters differ from the remaining counters in that they are actuated by the trip-resetting mechanism and are reset by the daily-total resetting mechanism. To effect the actuating movement of these counters, the shaft 59 is provided at one end with a crank-arm 85, to which is pivoted the upper end of a link 86, the lower end of said link being pivoted to one end of a lever 87, fulcrumed at 88 on a bracket 89, supported from the base 1. The other end of the lever 87 is connected by a link 90 with the operating-yoke 91 of the counter $J^3$. This yoke is connected with the similar yoke of the counter $J^2$ by an arched coupling-bar 92, so that the two yokes move in unison, and each time that the said resetting-shaft 59 is given a complete rotation one unit is added to both of the counters $J^2$ and $J^3$. The resetting of these counters is accomplished in the following manner: The counter $J^3$ is reset directly by the rotation of the shaft 27, on which its printing-wheels are mounted in the same manner as that of the other printing-wheels reset by said shaft. The counter $J^2$ is reset by means of a gear connection with the shaft 27 through the gear 75, an idle gear 93, and a gear 94, which rotates a resetting-sleeve 95, on which the printing-wheels of the counter $J^2$ are mounted in the usual manner.

Although it is not necessary to disconnect the counters $H^2$ and $H^3$ during the resetting of the daily counters, this result may be effected by providing at one end of the slide-bar 65 an arm 96, which extends into the path of a collar 97 on the key 74, so that when said key is pressed home the slide-bar 65 will be moved over so as to disconnect the gearing between the two counters.

The consecutive trip group of counters also comprises a direction or station printing wheel K, which is mounted loosely on the shaft 26 and which is operated by the trip-resetting mechanism through the same means which serves to operate the trip-number-printing counters.

In connection with the daily-total group of printing-counters I employ a printing-plate 98, (shown in detail in Fig. 22 of the drawings,) and having suitable openings or mortises 99 therein, through which the printing-counters project so as to be flush with the printing-surfaces thereof. This printing-plate has suitable legends thereon, comprising in the present instance the name of the company using the register, the number of the register, and column-headings descriptive of the impressions given by the different printing-counters of the daily-total group. It also comprises the heading "Daily-total record" for the impression taken from the daily-total group of counters and the heading "Consecutive-trip record" for the impression taken from the other group of counters. It is also provided with a slot or keyway 100 to receive the cashier's key hereinafter referred to. I also provide in this printing-plate an opening or mortise 101 to receive certain date printing-wheels which are arranged in alinement with the shaft 27 and adjacent to the grand-total counter $G'$. This date printing mechanism comprises a printing-wheel 102, bearing the names of the months and mounted upon a shaft 103, provided at its outer end with an operating-head 104. A second printing-wheel 105 bears upon its periphery as printing characters the numerals from "0" to "9" and is mounted on a sleeve 106, fitting loosely on the shaft 103 and provided at its outer end with an operating-head 107. 108 is a third number printing-wheel, mounted on a sleeve 109, encircling the sleeve 106 and provided at its outer end with an operating-head 110. By means of these heads the printing-wheels may be set to print any desired date, and said wheels are provided with the usual detent mechanism to hold them in any position to which they may be set.

The brackets 25 support a slideway 111, in which is removably placed a printing-plate 112, bearing the number of the car in connection with which the register is used, this plate being removable, so that it may be changed when the register is changed from one car to another. This slideway also serves as a support for the conductor's key hereinafter referred to, the printing-plate only occupying the inner end of the slideway and leaving sufficient room in the outer portion of the slideway to receive the conductor's key.

It will be understood, of course, that in addition to the mechanisms and devices which I have already described the register proper may be provided with trip passenger-indicating wheels, as indicated at 113 in Fig. 7, a direction-indicating wheel, as indicated at 114 in Fig. 6, and fare-indicators, all as set forth in my prior application hereinbefore referred to. As these features form no part of my present invention, however, they are neither described or illustrated in detail.

Referring now to the printing mechanism, the same is located below the registering mechanism hereinbefore described, being supported in a separate frame 115, secured to the lower portion of the base 1. This printing mechanism comprises means for supplying ink to the printing-surfaces carried by the register proper, means for supporting a roll of paper and feeding it to and from the printing-surfaces, and means for impressing the strip of paper after it is drawn from the roll against the printing-surface during the intervals between the feeding movements. There being two groups of printing-surfaces, provision is made for varying the travel of the inking and impression devices and for varying the character of the feed, so that the printing mechanism may be used in connection with either one of the two printing-surfaces just referred to. Provision is further made for automatically controlling the operations of the printing mechanism by means of the conductor's and cashier's keys hereinbefore referred to, so that when either key is inserted in the machine the printing mechanism will print only the record corresponding to the key thus inserted.

The frame 115 comprises two brackets 116, extending forward from the lower portion of the machine. Each of these brackets has mounted on its inner face a guide-plate or track-plate 117, having formed therein the grooves or ways which control the path of the impression-roller. These track-plates are vertically adjustable by means of screws 118, which pass upward through slotted lugs 119 on the frame 115 and are provided with nuts 120, which rest on top of the lugs. The upper ends of these adjusting-screws abut against the lower edges of the track-plates, and by their means said track-plates may be vertically adjusted in an obvious manner, so as to bring the path of the impression-roller closer to or farther from the printing-surface, thereby regulating the impression. In order to guide the track-plates during their movement of vertical adjustment and prevent their displacement longitudinally, they are in guiding engagement with the brackets 116 by means of a vertical rib or projection on one of the parts and a corresponding vertical groove in the other part. In the present instance I have shown each bracket 116 as provided with a vertical groove 121, each track-plate having a similar projection 122 fitting in said groove. Each track-plate is provided with a guideway or groove comprising an upper portion 123 and a lower portion 124 parallel therewith, the upper portion being that in which the impression-roller travels during its operative stroke and the lower portion that in which said roller travels during its return stroke. These groove portions 123 and 124 are connected at their front and rear ends, respectively, by downwardly and rearwardly inclined grooves 125 and 126. At the central portion the grooves 123 and 124 are connected by two downwardly and forwardly inclined grooves 127 and 128, separated by a projection 129. At the junction of the grooves 125 and 123 is located a spring-controlled switch 130, normally closing the upper end of the groove 125. At the junction of the grooves 123 and 127 is located a spring-controlled switch 131, normally closing the groove 123 at that point. At the junction of the grooves 124 and 128 is located a spring-controlled switch 132, normally closing the groove 124 at that point. At the junction of the grooves 124 and 126 is located a spring-controlled switch 133, normally closing the lower end of the groove 126. These switches are mounted on stud-shafts 134 (shown in Fig. 16) and having coiled around them springs 135, connected to fixed pins 136, apertures 137 being formed through the brackets 116 to give access to said shafts and springs.

The impression and inking rollers are mounted in a carriage 138, which slides in ways formed by flanges 139 and 140 at the top and bottom, respectively, of the track-plates 117. This carriage is provided at each end with a vertical slot 141, and the shaft 142 of the impression-roller 143 extends through these slots into engagement with the guiding-grooves of the track-plates. The impression-roller thus partakes of the reciprocating movement of the carriage, but is at the same time free to move vertically under the influence of the guiding-grooves. Said impression-roller has a body constructed, preferably, of rubber or other similar material. The inking-roller comprises a body 144, of felt or other similar material, and a shaft 145, which rests in open bearings 146 at each end of the carriage 138. The body of the roller may be divided into sections by means of circumferential grooves 147, as shown in Fig. 11, these sections being provided with inks of different colors, if desired.

148 indicates a guard-plate to prevent the paper from coming into contact with the inking-roller, said guard-plate being pivoted to the carriage 138 at 149 and being held in position against a stop 150 by means of springs 151, coiled around the shaft 149 on the carriage 138. The carriage is actuated by means of a rock-shaft 153, provided at one end with an operating-handle 154 and having mounted on its central portion a pinion 155, which meshes with a rack 156 on a sliding block 157, sliding in ways 158 on the under side of the frame 115. Motion is transmitted from this sliding block 157 to the carriage 138 by means of levers 159, pivoted between their ends to the blocks 160. The longer arms of these levers have pivotally connected to them at 161 the forward ends of links 162, the rear ends of which are pivoted at 163 to the carriage 138. The shorter ends of the levers 159 are pivotally connected at 164 to the forward ends of links 165, the rear ends of which are pivoted at 166 to the frame 115. By reason of this connection the comparatively short movement of the slide-block 157 will produce a very much longer travel of the carriage 138.

The paper is mounted on a roll 167, supported on a shaft 168, mounted in bearing-blocks 169, which have bearing-slots 170 extending upward from their lower edges. The shaft is held in position by spring-detents 171, which yield to permit the insertion of the shaft, but hold it in position after it is inserted, yielding, however, when sufficient force is applied to remove said shaft. 172 indicates a tension-plate, bearing upon the roll with a spring-pressure, said tension-plate being mounted on a shaft 173, around which are coiled springs 174, which give the desired tension-pressure. The paper as it is drawn from the roll passes around the rear edge of the carriage 138, which is rounded off, as shown in Fig. 14, to reduce the friction, said sheet of paper passing thence under the guard or shield 148 and over the impression-roller, being extended thence to the feed-rollers, hereinafter referred to. These feed-rollers are two in number, the lower roller 175 being mounted on a shaft 176 and having a body, preferably, of rubber or other similar material. The upper roller 177 is preferably constructed in sections, as shown, and is mounted on a shaft 178. The lower roller is preferably movable toward and from the upper roller, so as to permit the paper to be readily clamped and unclamped between the rollers. To this end the shaft 176 extends through slots 179 in the extensions 180 of the brackets 116. Under each end of said shaft there is mounted a sliding plunger 181 in a recess 182 in the end of the bracket 116, a spring 183 being located in said recess below said plunger and the recess being closed at its lower end by a screw-plug 184, which forms an abutment for the lower end of the spring. The roller 175 is thus normally pressed upward against the roller 177. In order to readily depress the roller 175, I provide at each end of said roller a swinging arm 185, pivoted at its upper end on the shaft 178 and provided with a cam-slot 186, through which the end of the shaft 176 extends. This cam-slot is provided with two recesses or seats 187 and 188 in its upper margin, and the lever is extended down to form a finger-piece 189. When the levers are swung forward, so that the ends of the shaft 176 rest in the seats 187, the roller 175 is pressed up against the roller 177; but by pushing back the arms 185 the ends of the shaft may be seated in the recesses 188, in which position the lower roller is disengaged from the upper roller. A projection 190 between the two recesses causes the arms and roller to remain in either position to which they may be moved. In the operation of feeding the paper the upper roller 177 is positively driven, the lower roller being preferably frictionally driven from the upper roller. To this end the upper roller is provided at one end with a gear 191, mounted loosely on the shaft 178, but connected therewith by a clutch 192, which causes the gear and shaft to rotate in unison during the forward and feeding movement of the parts, but permits the gear to rotate independently of the shaft during its reverse movement. At its other end the shaft 178 of the upper roller is provided with a gear 191ᵃ, which meshes with a gear 191ᵇ on the shaft 176 of the lower roller. The upper-roller shaft is also provided with a knurled head 191ᶜ, by means of which both rollers may be turned by hand to feed the upper forward independently of the feeding mechanism. To prevent the rollers from turning backward, the shaft 178 is also provided with a ratchet-wheel 193 secured thereon, preferably at the end opposite to that on which the gear 191 is mounted. This ratchet-wheel is engaged by a spring-pawl 194, which prevents rearward rotation of the shaft 178 and roller 177. The gear 191 meshes with a gear 195, which in turn meshes with a gear-segment 196, carried by a lever 197, mounted on the side of the bracket 116. This lever receives an oscillating movement through the medium of a crank-arm 198, mounted on the end of the shaft 153 and provided with a crank-pin 199, which engages a slot in the lever 197. This slot comprises a main portion 200 and two diverging branches 201 and 202. At the junction of the main and branch portions of the slot there is located a switch-point 203, pivoted at 204 to the lever 197. This switch-point is provided with two projecting arms 205 and 206 and with a spring detent-pin 207, which may engage either one of the two locking-recesses 208 and 209 in the lever 197 to hold the switch-point in either of its two positions. Coöperating with the arms 205 and 206 is a fixed pin 210, projecting from one of the lugs 211, in which the shaft 153 has its bearings. This pin lies in the path of the arms 205 and 206, so that when the lower end of the lever 197 is moved over in the manner hereinafter described so as to swing in a path lying in front of the pin the arm 205 will during this moving over clear the pin 210; but the arm 206 will strike said pin and will swing the switch-point over, so that the crank-pin 199 will travel in a guideway formed by the slot 200 and the branch slot 202. When the parts are in this position, the daily-total record is being printed, and the range of movement imparted to the lever 197 and to the feed-rollers is relatively large in order to feed forward the paper a distance sufficient to correspond to the length of the daily total record, which is comparatively great. When the lower end of the arm 157 is moved back so as to swing in a path behind the pin 210, the arm 206 clears said pin; but the arm 205 comes into contact with it and shifts the switch-point to the position shown in Fig. 15, in which position the crank-pin 199 travels in a guideway formed by the main slot 200 and the branch slot 201. This imparts a relatively small movement to said arm and to the feed-rollers, so that the paper is fed forward only sufficiently to accommodate the successive trip-records, which are comparatively short, being of a single line each.

The range of movement of the printing-carriage, and, secondly, the character of the printed record, is controlled by two stop-pins 212 and 213, mounted to slide in suitable recesses through the wall of one of the brackets 116, their inner ends being adapted to be projected into the grooves 123 and 124, respectively, above and below the projection or abutment 129, as shown in Fig. 14. The outer ends of these pins are pivoted to the opposite ends of a lever 214, having a central fulcrum on a support 215, so that when one of the said stop-pins is projected into its groove the other stop-pin is withdrawn from its groove. The movement of these stop-pins is controlled, by means of an inclined or diagonal cam-groove 216, in a slide-bar 217, mounted to slide forward and backward on the top of the bracket-arm 116. This cam-groove is engaged by the upper end of a pin or projection 218, extending up from the stop-pin 212 and guided by means of lateral guideways 219, which insure the travel of said pin in a direction at right angles to the travel of the slide-block 217. As a matter of convenience the pin 218 is provided with a roller 220 to engage the guideways 219. 221 represents a plate secured to the top of the bracket-arm 116 and serving as a supporting-surface for the slide-bar 217, which travels thereon, being guided by screws 222 from the plate 221, passing through the slots 223 in the slide-bar. The slide-bar 217 is controlled by a conductor's key 224 and by a cashier's key 225, each of which is provided with a projecting pin 226 and with a ward 227 in the shape of a longitudinal rib, the ribs on the two keys being located in different longitudinal planes. Each key bears upon its under face printing characters which constitute an identifying-mark to identify the user of the key—such, for instance, as a number to indicate the individual and a letter or letters to indicate his official character. The slide-bar 217 is provided near its front end with an inclined slot 228 and near its rear end with a reversely-arranged inclined slot 229, the former being adapted to receive the projection 226 of the conductor's key and the latter to receive the similar projection of the cashier's key. The plate 221 is provided with a guideway 230 to receive the conductor's key, said guideway having a longitudinal groove 231 to receive the ward 227 of said key. At its rear said plate 221 has a second guideway 232 to receive the cashier's key, said guideway being provided with a groove 233 to accommodate the ward of that key. The difference in the locations of the wards and grooves prevents the keys being used interchangeably. When either key is thrust through its guideway with the printed characters downward for a distance such as to bring said characters into printing position, the projection 226 will engage the corresponding inclined groove of the slide-bar 217 and move said slide-bar either forward or back. In practice the insertion of the conductor's key moves the slide-bar to the rear, while the insertion of the cashier's key moves it to the front. The slide-bar is provided with a projection 234 at its rear end which is adapted to engage the arm 23 when the slide-bar is moved rearward, thereby lifting the locking-bar 15 and unlocking the register. Except when the conductor's key is thus inserted in the machine the slide-bar is moved sufficiently forward by means of a spring, hereinafter referred to, to permit the locking-bar to fall into locking position. The rearward movement of the slide-bar 217, caused by the introduction of the conductor's key, causes the pin 212 to project into the guiding-groove 123, while the insertion of the cashier's key withdraws said pin 212 and causes the pin 213 to project into the groove 124. The printing mechanism is locked at all times, except when one or the other of the two keys is inserted in the machine. To this end the shaft 153 is provided with a collar 235, having therein a notch 236.

237 indicates a locking-bar sliding vertically on the side of the bracket 116 and provided with a projection 238 at its lower end adapted to ride on the collar 235 or engage the notch 236. This slide-bar is normally drawn downward by a spring 239 and its upper end is provided with a pin 240, with which coöperates a V-shaped recess 241 in the slide-bar 217, having downwardly-converging front and rear walls. The spring 239 tends to draw the locking-bar downward into engagement with the notch 236 when the operating-lever 154 is in its normal position, which is horizontal. This movement of the locking-bar also serves to hold the slide-bar 217 in a central or neutral position, in which position the main locking-bar 15 of the register is in locking position. When either one of the keys is inserted into the machine, so as to move the slide-bar 217 either forward or backward, one of the two inclined walls of the recesses 241 engages the pin 240 and lifts the same, so as to unlock the shaft 153 and permit the printing mechanism to operate.

Referring now to the operation of the printing mechanism, it will be observed that when the conductor's key is inserted in the machine and the stop-pin 212 is projected into the groove 129, the actuating-shaft 153 being at the same time unlocked, an upward motion of the operating-lever 154 to the position shown in Fig. 16 will move the printing-carriage forward from its normal position to the extreme forward end of its travel, bringing the shaft of the printing-roller up into the upper guide-groove 123, its return through the groove 125 being prevented by the switch 130. This upward movement of the lever 154 also gives a limited feed movement to the feed-rollers and advances the record-sheet a distance sufficient to accommodate one consecutive-trip record. A downward movement of the lever 154 to its original position causes the impression-roller to travel rearward along the guideway 123, taking upon the sheet of paper an impression of the counters and printing-wheels constituting the consecutive-trip-record group. This downward movement of the operating-lever 154 is arrested by the contact of the ends of the shaft 142 of the impression-roller 143 with the stop-pin 212, thus indicating to the conductor the completion of the operation of making the record. When another trip-record is to be printed, the same upward-and-downward motion of the operating-lever will print the record. When the conductor's key is withdrawn, the printing mechanism is locked in the manner hereinbefore described. When the cashier's key is inserted, the stop-pin 212 is withdrawn and the stop-pin 213 is projected into the guiding-groove 124. The cashier in printing his record moves the lever first downward from its normal horizontal position and then upward to said normal position. The first of these movements carries the printing-roller rearward along the groove 123 under the printing-wheels of the second or daily-total group and makes upon the record-sheet a printed record of the printing-plate and of the figures indicated by the printing-counters of the second group. At the end of this downward movement of the operating-lever the printing-roller is in the position shown in Fig. 14, and the return upward movement of the operating-lever to its normal position carries the impression-roller forward until its shaft comes into contact with the stop-pin 213. This indicates to the cashier the completion of the operation of printing the record; but a duplicate record may be immediately obtained by again depressing and raising the operating-lever. The switches 132 and 133 serve in an obvious manner to guide the impression-roller during the operation of printing the daily-total record, while the inking-roller serves in an obvious manner to supply the printing characters with ink. The printing-carriage, with its impression and inking rollers, thus has two different impression-paths, and the travel of said carriage in one path or the other is controlled by the stop-pins 212 and 213, the position of which is in turn controlled by the conductor's and cashier's keys. In this way when the conductor's key is inserted only the consecutive-trip record can be printed, while the insertion of the cashier's key renders it possible to print only the daily-total record. When neither key is inserted, the printing mechanism is locked.

It should be noted in connection with the feeding mechanism that the different arcs of movement of the controlling-lever 157 when the two different records are being printed swing the lower end of the lever 197 over to one side or the other of the pin 210, so that the variation in feed hereinbefore described is effected in the manner already set forth. It has already been pointed out that the printing of the consecutive-trip record produces a relatively small feed movement of the paper, and attention is now called to the fact that the upward movement of the operating-lever 154 from its lowest position to its normal position, during which the impression-roller is traveling from the position shown in Fig. 14 to a position in contact with the stop-pin 213, gives a relatively great feeding motion to the feed-rollers, so as to move out of the way the impression last taken and bring under the printing-plate and daily-total group of printing-counters sufficient of the unprinted sheet to receive the impression from said parts.

Considering the operation of the machine as a whole, it is placed normally locked as to both its printing and registering mechanism in the street-car. Provision is made of a suitable operating mechanism by which any one of the actuating-slides may be operated. The conductor then inserts his key, thereby unlocking both the registering and printing mechanisms and at the same time placing that portion of his key which bears the distinctive printing characters in printing position in the slideway 111. The conductor then proceeds to collect his fares, actuating the corresponding actuating slide according to the character of the fare received. The two printing-counters of the two groups corresponding to the particular kind or class of fare received will have one unit added on them for each fare of that class thus received. At the same time for each fare received the common slide-bar is so actuated as to register an additional unit on both the grand-total printing-counter and the two trip-total printing-counters. If the fare is a cash fare, in addition to the adding of a unit to each of the two classified fare printing-counters for that particular class of fare the actual amount of the fare in cash is added to both of the total-cash printing-counters. At the end of the trip the conductor prints the record of the trip by moving the operating-lever 154 first upward and then downward. He then resets the machine for the next trip by turning the operating-head 68. This turns all of the printing-counters of the first group back to zero without affecting any of the printing-counters of the second group and at the same time adds one on both of the trip-number printing-counters and turns the direction-indicating wheel so as to cause it to print the direction of the next trip. As long as the same conductor remains in charge of the car he prints the record of each trip, identifying himself at the same time by the impression of the distinctive character of his key upon the record thus made. When another conductor takes charge of the car, the first conductor's key is withdrawn and the second conductor's key is inserted, so that the records made by each conductor are properly identified as to the maker. At the end of the day or at any other predetermined period the conductor withdraws his key after printing his last record and resetting the first group to zero, and the cashier inserts his key. The cashier proceeds to take the daily-total record by moving the operating-lever 154 first downward and then upward. This prints a record from the second or daily-total group of printing-wheels and plate and at the same time makes a record of the cashier's identifying-mark, together with the date and the grand total. The cashier then by means of the key 73 resets all of the printing-counters of the second or daily-total group to zero, as well as the trip-number printing-counters. As hereinbefore noted, however, the grand-total printing-counter and the direction-printing wheel are unaffected by the cashier's resetting operations, and the grand-total printing-counter is unaffected by either resetting operation.

It is obvious that the application of my invention is not limited to the registering and recording of street-car fares, and although I have shown it as embodied in a machine of that character it will at once be seen that the invention is capable of a much wider application, it being adapted for the registering and the production of records of data of various kinds. Moreover, it will at once be apparent that portions of the invention may be employed without necessarily involving the employment along with them of all of the various features hereinbefore enumerated. It will also be apparent that various modifications may be made in the details of construction without departing from the principle of my invention. For instance, as I have already stated, the printing-wheel shown as provided with characters for indicating the direction of the trip, as "in" or "out," may be employed as a station-printing wheel, bearing the names of the consecutive stations when the register is used on interurban lines and a record is taken at each station. Moreover, the particular structure of the keys may be varied in ways obvious to those familiar with the art without involving a departure from the broader principles of the invention. I therefore do not wish to be understood as limiting myself to the precise construction and arrangement of parts hereinbefore described and shown in the accompanying drawings.

Having thus fully described my invention, what I claim as new, and desire to secure by Letters Patent, is—

1. A mechanism of the class described, comprising duplicate printing-counters, means for simultaneously operating said counters, means under the control of the operator for resetting one of said duplicates only, and printing mechanism for printing a record from either of said duplicates, substantially as described.

2. In a mechanism of the character described, duplicate printing-counters, means for simultaneously operating said counters, means under the control of the operator for resetting one of said duplicates only, a key-controlled printing mechanism for printing a record from either of said duplicates, and an operator's or conductor's key controlling said printing mechanism, said printing mechanism being operative to print a record only from the duplicate of which the resetting is controlled by the operator, when said operator's key is in position, substantially as described.

3. A mechanism of the class described, comprising two groups of duplicate printing-counters, means for simultaneously operating the duplicate counters of the two groups, means under the control of the operator for resetting one of said groups only, and printing mechanism for printing a record from either of said groups, substantially as described.

4. In a mechanism of the character described, two groups of duplicate printing-counters, means for simultaneously operating the duplicate counters of both groups, means under the control of the operator for resetting one of said groups only, a key-controlled printing mechanism for printing a record from either of said groups, and an operator's or conductor's key controlling said printing mechanism, said printing mechanism being operative to print a record only from the group of which the resetting is controlled by the operator when said operator's key is in position, substantially as described.

5. A mechanism of the class described, comprising duplicate printing-counters, means for simultaneously operating said counters, means under the control of the operator for resetting one of said duplicates only, key-controlled printing mechanism for printing the record from either of said duplicates, an operator's or conductor's key controlling said printing mechanism to print a record only from the duplicate counter of which the resetting is controlled by the operator when said operator's key is in position, and an inspector's or cashier's key also controlling said printing mechanism, said printing mechanism being operative to print a record only from the duplicate counter of which the resetting is not controlled by the operator when said inspector's or cashier's key is in position, substantially as described.

6. In a mechanism of the character described, two groups of duplicate printing-counters, means for simultaneously operating the duplicate counters of both groups, means under the control of the operator for resetting one of said groups only, a key-controlled printing mechanism for printing a record from either of said groups, an operator's or conductor's key and an inspector's or cashier's key controlling said printing mechanism, and means whereby said printing mechanism is operative to print a record from one group of counters only when one of said keys is in position, and from the other group of counters only when the other key is in position, substantially as described.

7. In a mechanism of the character described, duplicate printing-counters, means for simultaneously operating said counters, means under the control of the operator for independently resetting one of said counters, a key-controlled printing mechanism for printing a record from either of said counters, and an operator's or conductor's key controlling said printing mechanism and provided with an identifying printing character, said printing mechanism being operative to print a record only from the counter of which the resetting is controlled by the operator, and from the operator's key, when said operator's key is in printing position, substantially as described.

8. In a mechanism of the character described, two groups of duplicate printing-counters, means for simultaneously operating the duplicate counters of both groups, means under the control of the operator for resetting one of said groups only, a key-controlled printing mechanism for printing the record from either of said groups, and an operator's key controlling said printing mechanism and provided with an identifying printing character, said printing mechanism being operative to print a record from the operator's key and from that group of counters only of which the resetting is controlled by the operator, when said operator's key is in printing position, substantially as described.

9. In a mechanism of the character described, two groups of duplicate printing-counters, means for simultaneously operating the duplicate counters of both groups, means under the control of the operator for resetting one of said groups only, a key-controlled printing mechanism for printing the record from either of said groups, an operator's or conductor's key and an inspector's or cashier's key controlling said printing mechanism and being provided with an identifying printing character, and means whereby said printing mechanism is operative to print a record from one group of counters only, and from the key, when one of said keys is in position, and from the other group of counters only, and from the key, when the other key is in position, substantially as described.

10. A register and recorder, comprising a normally locked register having duplicate counters, means for simultaneously operating said counters, and means for independently resetting one of said counters after each record is printed, and a normally locked printing mechanism for printing a record from either counter, an operator's key provided with an identifying printing character, means whereby the register is unlocked and the printing mechanism is unlocked to print a record from said key, and from one of the duplicate counters only, when the operator's key is in printing position, an inspector's key having an identifying printing character, and means for printing a record from said key, and from the other counter only when said inspector's key is in printing position, substantially as described.

11. A register and recorder, comprising a normally locked register having duplicate counters, means for simultaneously operating said counters, and means for independently resetting one of said counters after each record is printed, and a normally locked printing mechanism for printing a record from either counter, an operator's key provided with an identifying printing character, means whereby the register is unlocked and the printing mechanism is unlocked to print a record from said key, and from one of the duplicate counters only, when the operator's key is in printing position, an inspector's key having an identifying printing character, and means for printing a record from said key, and from the other counter only when said inspector's key is in position, said register remaining locked when the inspector's key is inserted, substantially as described.

12. A register and recorder, comprising a normally locked register having duplicate counters, means for simultaneously operating said counters, and means for independently resetting one of said counters after each record is printed, and a normally locked printing mechanism for printing a record from either counter, an operator's key provided with an identifying printing character, means whereby the register is unlocked and the printing mechanism is unlocked to print a record from said key, and from one of the duplicate counters only, when the operator's key is in printing position, an inspector's key having an identifying printing character, and means for printing a record from said key, and from the other counter only when said inspector's key is in position, and a separate key-controlled mechanism for resetting the last-mentioned counter, substantially as described.

13. A register and recorder, comprising a normally locked register having two groups of duplicate printing-counters, means for simultaneously operating the duplicate counters of both groups, means under the control of the operator for independently resetting one of said groups, and key-controlled means for separately resetting the other group, in combination with a normally locked printing mechanism for printing a record from either group, an operator's key provided with an identifying printing character, means for unlocking the register and for unlocking the printing mechanism to print a record from said key, and from one of the groups of counters only, when said operator's key is in printing position, an inspector's key provided with an identifying printing character, and means for unlocking the printing mechanism to print a record from said key, and from the other group of counters only, when said inspector's key is in printing position, the register remaining locked except when the operator's key is in printing position, substantially as described.

14. A mechanism of the class described, comprising two groups of duplicate printing-counters, a printing-plate coöperating with one of said groups, printing mechanism for printing a record from either of said groups, and a variable feed for automatically regulating the feed of the paper, whereby said feed is greater when a record is printed from the group with which the printing-plate coöperates, substantially as described.

15. A mechanism of the character described, comprising a grand or daily total group of printing-counters, and a coöperating printing-plate, and a duplicate group of subtotal printing-counters, means for simultaneously actuating the duplicate counters of both groups, and a printing mechanism comprising inking and impression devices movable into operative relation to either group of counters, feeding devices for feeding the impression-strip or record-paper, and automatic mechanism for varying the feed, whereby said strip is fed to a greater extent when an impression is taken from the group and plate, and to a less extent when an impression is taken from the group without the plate, substantially as described.

16. A fare register and recorder, comprising a daily-total group of printing-counters and a consecutive-trip group of printing-counters, said groups comprising duplicate classified fare-counters, duplicate cash-total counters, duplicate trip-total passenger-counters, and duplicate trip-number counters, means for simultaneously and equally actuating the duplicate cash, fare and passenger counters of both groups, means for independently resetting all of the counters of the consecutive-trip group and simultaneously actuating the trip-number counter, and means under separate control for printing a record from either one of said groups, substantially as described.

17. A fare register and recorder, comprising a daily-total group of printing-counters and a consecutive-trip group of printing-counters, said groups comprising duplicate classified printing-counters, duplicate cash-total counters, duplicate trip-total passenger-counters, and duplicate trip-number counters, the daily-total group including a grand-total passenger-counter and the consecutive-trip group including a direction or station printing-wheel, means for simultaneously and equally actuating the duplicate cash, fare and passenger counters of both groups and the grand-total passenger-counter, means for independently resetting all of the cash, fare and passenger counters of the consecutive-trip group and simultaneously actuating the trip-number counter and direction or station printing-wheel, and separate means for independently resetting all of the counters of the daily-total group except the grand-total counter, and simultaneously resetting the trip-number counters of both groups, substantially as described.

18. A mechanism of the class described, comprising duplicate printing-counters, means for simultaneously operating said counters, and printing mechanism for printing a record exclusively from either of said duplicates, substantially as described.

19. A mechanism of the class described, comprising a plurality of groups of duplicate printing-counters, means for simultaneously operating the duplicate counters of the two groups, and printing mechanism for printing a record exclusively from any one of said groups, substantially as described.

20. A mechanism of the character described, comprising two printing-counters, means for actuating said counters, means for intermittently feeding an impression-strip past both of said counters, and impression mechanism for pressing said impression-strip against either one of said counters exclusively, substantially as described.

21. A mechanism of the class described, comprising duplicate printing-counters, means for simultaneously operating said counters, a single printing mechanism, and means for varying the operative path of said printing mechanism to cause it to print at will a record from either one of said printing-counters exclusively, substantially as described.

22. A mechanism of the character described, comprising duplicate printing-counters, means for simultaneously operating said counters, means for separately resetting one of said counters, means for intermittently feeding an impression-strip past both of said counters, and impression mechanism for pressing said impression-strip against one of said counters consecutively prior to each resetting, and for subsequently impressing said strip against the other counter, whereby a succession of records from the one of said counters and a total record from the other of said counters is impressed on the same impression-strip, substantially as described.

In testimony whereof I affix my signature in presence of two witnesses.

WILFRED I. OHMER.

Witnesses:
 L. T. WHISTLER,
 E. J. FINKE.